United States Patent
Balasubramanian et al.

(10) Patent No.: US 12,047,887 B2
(45) Date of Patent: Jul. 23, 2024

(54) FULL-DUPLEX SIDELINK SYNCHRONIZATION

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 17/380,620

(22) Filed: Jul. 20, 2021

(65) Prior Publication Data

US 2022/0095251 A1  Mar. 24, 2022

Related U.S. Application Data

(60) Provisional application No. 63/081,540, filed on Sep. 22, 2020.

(51) Int. Cl.
| | | |
|---|---|---|
| H04W 56/00 | (2009.01) | |
| H04L 5/14 | (2006.01) | |
| H04W 72/04 | (2023.01) | |
| H04W 72/0446 | (2023.01) | |
| H04W 4/80 | (2018.01) | |

(52) U.S. Cl.
CPC .......... H04W 56/001 (2013.01); H04L 5/14 (2013.01); H04W 72/0446 (2013.01); H04W 4/80 (2018.02)

(58) Field of Classification Search
CPC . H04W 56/001; H04W 72/0446; H04W 4/80; H04L 5/14
See application file for complete search history.

(56) References Cited

U.S. PATENT DOCUMENTS

| | | | | |
|---|---|---|---|---|
| 10,523,347 | B2 * | 12/2019 | Hwang | H04L 5/0048 |
| 10,735,078 | B2 * | 8/2020 | Ly | H04L 5/0098 |
| 11,128,369 | B2 * | 9/2021 | Wei | H04W 76/19 |
| 11,147,073 | B2 * | 10/2021 | Liou | H04L 5/0092 |
| 11,218,280 | B2 * | 1/2022 | Futaki | H04W 56/001 |
| 11,228,899 | B2 * | 1/2022 | Ou | H04W 8/08 |
| 11,245,510 | B2 * | 2/2022 | Cirik | H04L 5/0092 |
| 11,818,740 | B2 * | 11/2023 | Yerramalli | H04B 17/309 |
| 2019/0159261 | A1 * | 5/2019 | Jung | H04W 72/542 |
| 2019/0261411 | A1 * | 8/2019 | Chin | H04W 80/02 |
| 2019/0313410 | A1 * | 10/2019 | Yang | H04W 36/0094 |
| 2019/0349964 | A1 * | 11/2019 | Liou | H04W 76/27 |
| 2019/0350023 | A1 * | 11/2019 | Novlan | H04L 5/16 |
| 2019/0394776 | A1 * | 12/2019 | Lee | H04W 16/14 |
| 2020/0053637 | A1 * | 2/2020 | Tsai | H04L 5/001 |
| 2020/0053670 | A1 * | 2/2020 | Jung | H04W 56/0015 |
| 2020/0229114 | A1 * | 7/2020 | Ryu | H04L 5/0091 |
| 2020/0229271 | A1 * | 7/2020 | You | H04W 72/53 |
| 2021/0022096 | A1 * | 1/2021 | Rane | H04W 16/28 |

(Continued)

*Primary Examiner* — Bailor C Hsu
(74) *Attorney, Agent, or Firm* — Patterson + Sheridan, LLP

(57) ABSTRACT

Certain aspects of the present disclosure provide techniques for full-duplex sidelink synchronization. A method that may be performed by a user equipment (UE) includes monitoring for a first synchronization block (SSB) at a first frequency location and at a first occasion within a period and transmitting a second SSB at a second frequency location and at the first occasion within the period.

30 Claims, 9 Drawing Sheets

(56) References Cited

U.S. PATENT DOCUMENTS

| | | | | |
|---|---|---|---|---|
| 2021/0168815 A1* | 6/2021 | Kim | ............... | H04J 11/0076 |
| 2021/0194571 A1* | 6/2021 | Ma | ............... | H04B 7/2125 |
| 2021/0235403 A1* | 7/2021 | Lee | ............... | H04L 5/001 |
| 2021/0258895 A1* | 8/2021 | Sakhnini | ............... | H04W 24/08 |
| 2022/0022247 A1* | 1/2022 | Agiwal | ............... | H04W 56/001 |
| 2022/0369317 A1* | 11/2022 | Ma | ............... | H04B 1/713 |

\* cited by examiner

FULL-DUPLEX SIDELINK SYNCHRONIZATION

CROSS REFERENCE TO RELATED APPLICATION

This Application hereby claims priority under 35 U.S.C. § 119 to pending U.S. Provisional Patent Application No. 63/081,540, filed on Sep. 22, 2020, the contents of which are incorporated herein in their entirety.

BACKGROUND

Field of the Disclosure

Aspects of the present disclosure relate to wireless communications, and more particularly, to techniques for full-duplex sidelink synchronization.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable spectral and/or time-domain efficiency in synchronization.

Certain aspects of the subject matter described in this disclosure can be implemented in a method for wireless communications by a user equipment (UE). The method generally includes monitoring for a first synchronization block (SSB) at a first frequency location and at a first occasion within a period and transmitting a second SSB at a second frequency location and at the first occasion within the period.

Certain aspects of the subject matter described in this disclosure can be implemented in a user equipment (UE). The UE generally includes means for monitoring for a first synchronization block (SSB) at a first frequency location and at a first occasion within a period and means for transmitting a second SSB at a second frequency location and at the first occasion within the period.

Certain aspects of the subject matter described in this disclosure can be implemented in a user equipment (UE). The UE generally includes a processing system configured to monitor for a first synchronization block (SSB) at a first frequency location and at a first occasion within a period and a transmitter configured to transmit a second SSB at a second frequency location and at the first occasion within the period.

Certain aspects of the subject matter described in this disclosure can be implemented in an apparatus for wireless communications by a user equipment (UE). The apparatus generally includes a processing system configured to monitor for a first synchronization block (SSB) at a first frequency location and at a first occasion within a period and an interface configured to output for transmission a second SSB at a second frequency location and at the first occasion within the period.

Certain aspects of the subject matter described in this disclosure can be implemented in a computer-readable medium for wireless communications by a user equipment (UE). The computer-readable medium generally includes codes executable to monitor for a first synchronization block (SSB) at a first frequency location and at a first occasion within a period and output for transmission a second SSB at a second frequency location and at the first occasion within the period.

Aspects of the present disclosure provide UEs, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
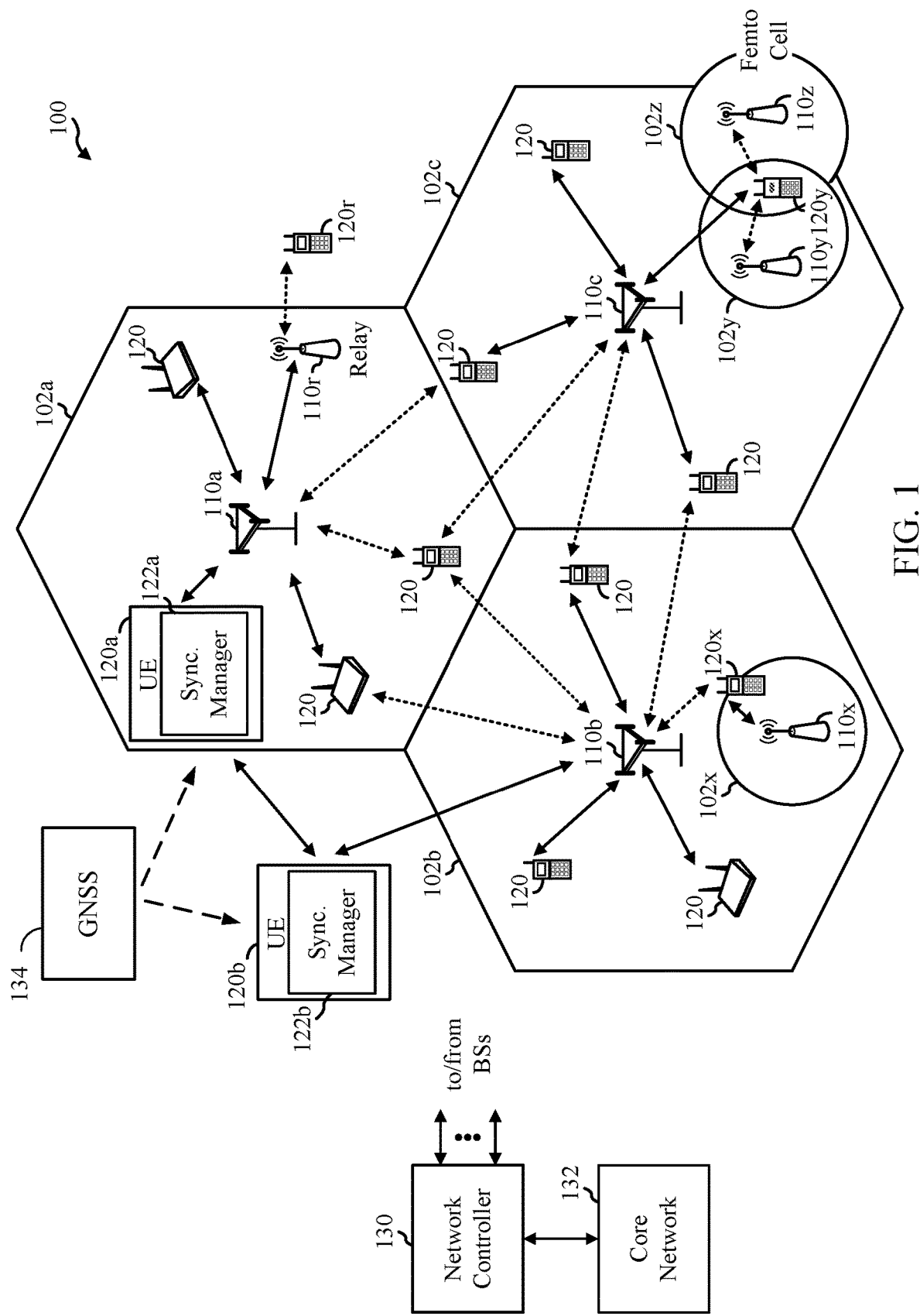
FIG. 1 is a block diagram conceptually illustrating an example wireless communication network, in accordance with certain aspects of the present disclosure.

Aspects of the present disclosure provide apparatus, methods, processing systems, and computer readable mediums for full-duplex sidelink synchronization. For example, aspects of the present disclosure provides synchronization techniques enable the coexistence/cooperation among full-duplex UEs and half-duplex UEs for acquiring synchronization amongst each other. In certain aspects, the synchronization techniques described herein may allocate synchronization resources solely for full-duplex UEs. In certain aspects, the full-duplex synchronization described herein may provide desirable spectral efficiency, latencies, and data rates, for example, due to concurrent transmissions and receptions. In certain cases, the full-duplex synchronization described herein may enable vehicle to everything (V2X) systems to share large payloads due to the data rates and bandwidth available to full-duplex communications.

The following description provides examples of synchronization in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported, as multi-layer transmissions. Aggregation of multiple cells may be supported.

FIG. 1 illustrates an example wireless communication network 100 in which aspects of the present disclosure may be performed. For example, the wireless communication network 100 may be an NR system (e.g., a 5G NR network).

As shown in FIG. 1, the UEs 120a, 120b include a synchronization manager 122a, 122b that provides frequency-time resource allocations for full-duplex synchronization, in accordance with aspects of the present disclosure. In certain cases, the UEs 120a, 120b may acquire frequency and timing synchronization from a base station (e.g., BS 110a or BS 110b) or another UE (e.g., UE 120a or UE 120b). In certain cases, the UEs 120a, 120b may acquire timing synchronization from a Global Navigation Satellite System (GNSS) 134.

Various sidelink channels may be used for sidelink communications, including a physical sidelink discovery channel (PSDCH), a physical sidelink broadcast channel (PSBCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSBCH may carry information related to synchronization such as the direct frame number (DFN), indication of the slot and symbol level time resources for sidelink transmissions, in-coverage indicator, etc. The PSCCH may carry control signaling such as sidelink resource configurations and other parameters used for data transmissions. The PSSCH may carry data transmissions, and the PSFCH may carry feedback such as hybrid automatic repeat request (HARM) feedback and/or channel state information related to a sidelink channel quality.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
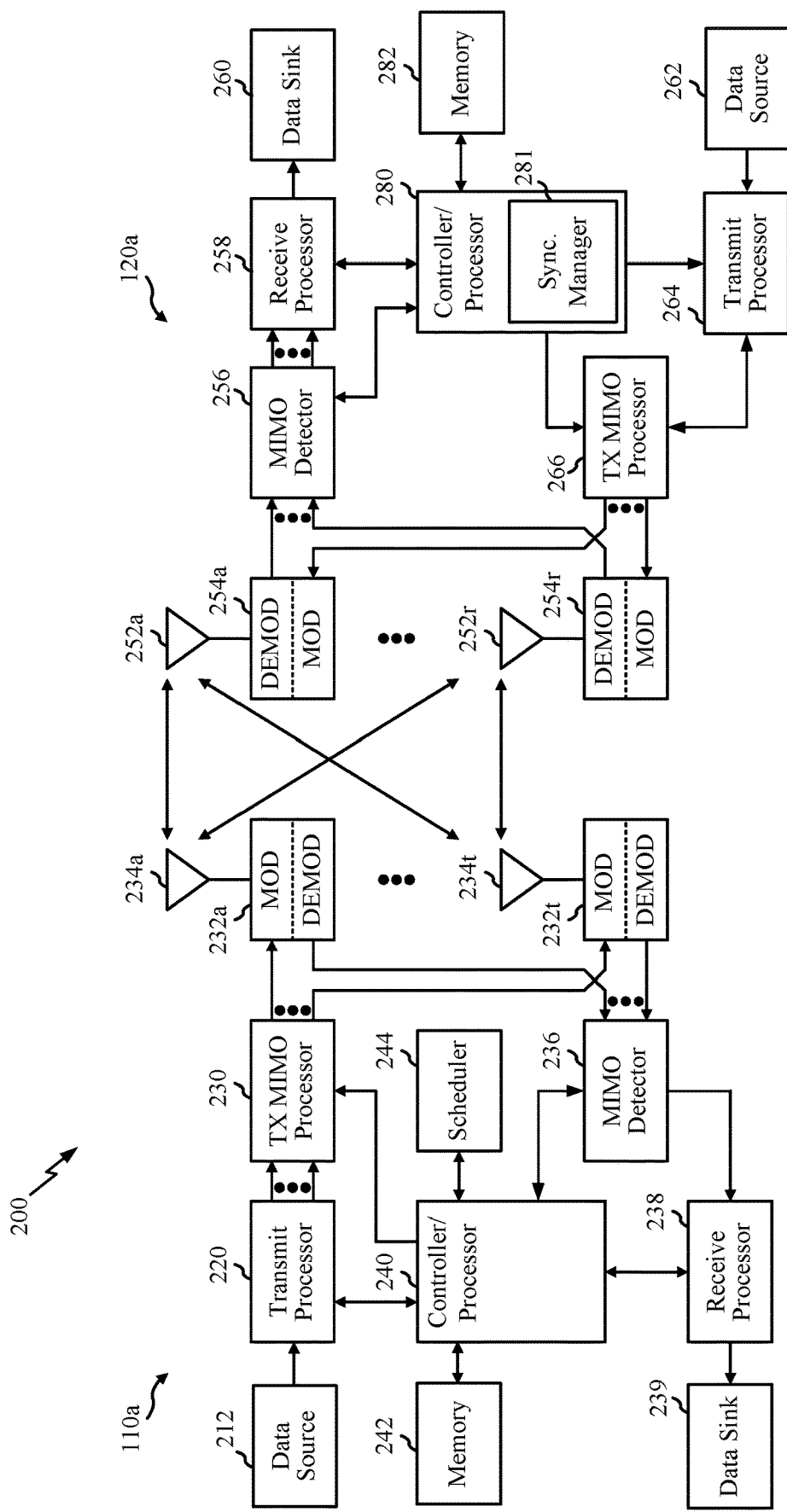
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a has a synchronization manager 281 that provides frequency-time resource allocations for full-duplex synchronization, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless communication device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
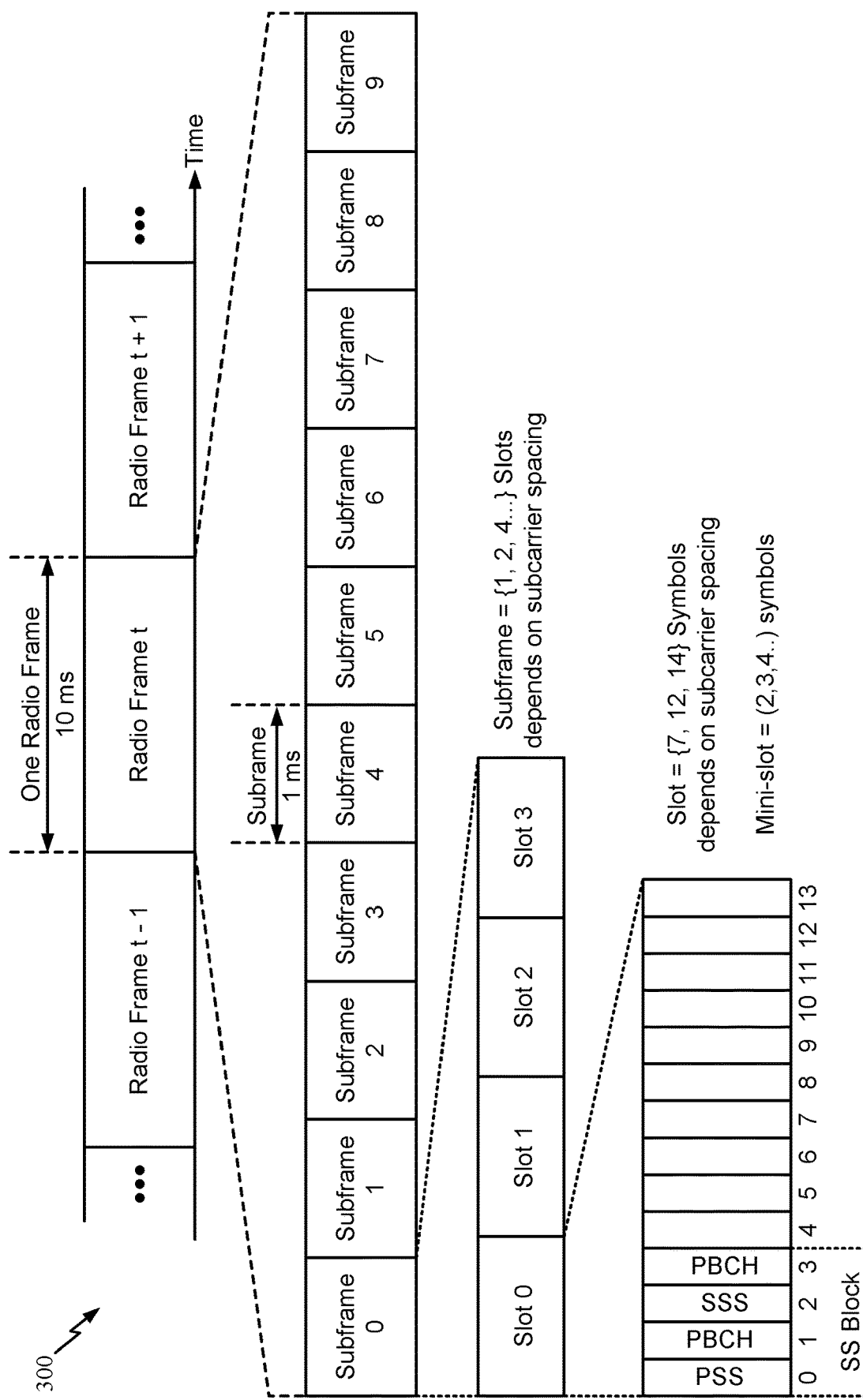
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figures 4A, 4B:
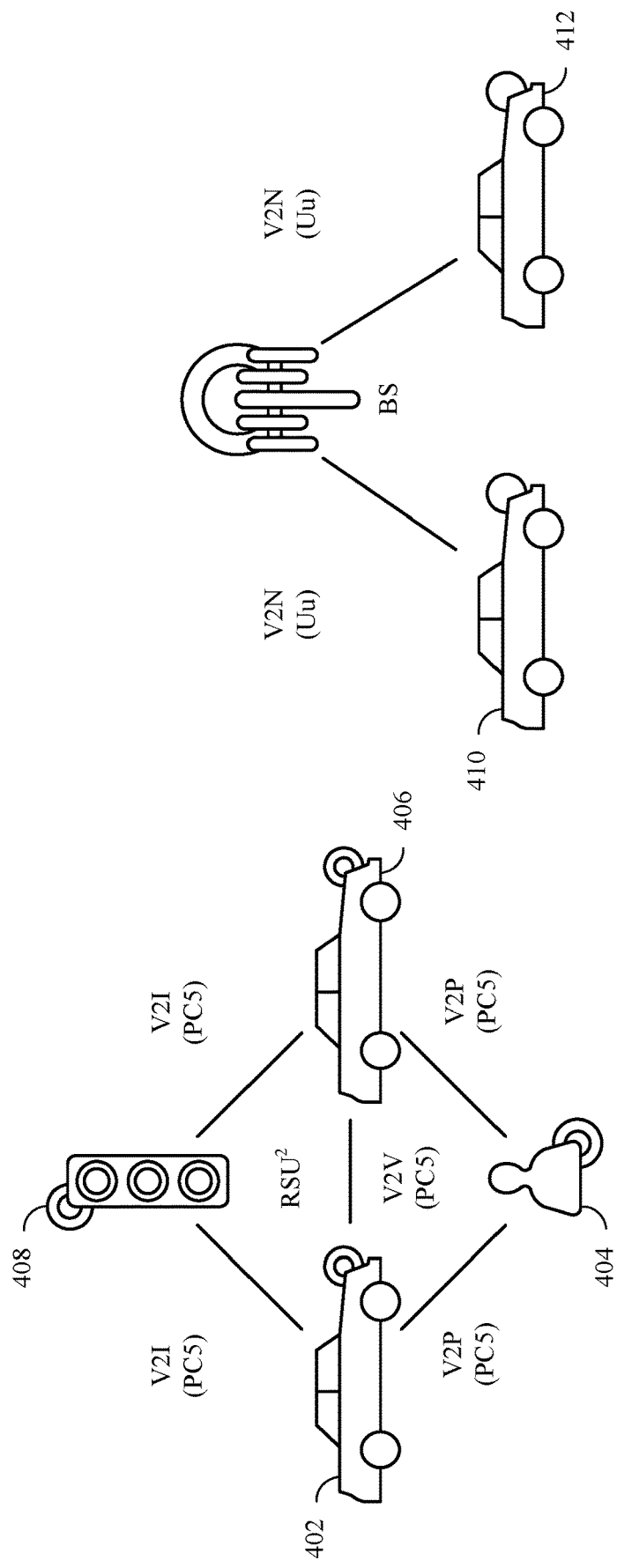
FIGS. 4A and 4B illustrate vehicle to everything (V2X) systems, in accordance with certain aspects of the present disclosure.

FIGS. 4A and 4B illustrate vehicle to everything (V2X) systems, in accordance with certain aspects of the present disclosure. The V2X systems, provided in FIGS. 4A and 4B provides two complementary transmission modes. A first transmission mode involves direct communications (e.g., also referred to herein as sidelink communications between UEs) between participants in the local area. Such communications are illustrated in FIG. 4A. A second transmission mode involves network communications through a network as illustrated in FIG. 4B, which may be implemented over a Uu interface (e.g., a wireless communication interface between a radio access network (RAN) and a UE).

Referring to FIG. 4A, a V2X system is illustrated with two vehicles. The first transmission mode allows for direct communication between different participants in a given geographic location. As illustrated, a first vehicle 402 can have a wireless communication link with an individual 404 (V2P) (e.g., via a UE) through a PC5 interface. Communications between the first vehicle 402 and a second vehicle 406 (V2V) may also occur through a PC5 interface. In a like manner, communication may occur from the first vehicle 402 to a roadside unit (RSU) 408, such as a traffic signal or sign (V2I) through a PC5 interface. In each example illustrated, two-way communication may take place between elements, therefore each element may be a transmitter and a receiver of information. In the configuration provided, the first transmission mode is a self-managed system and no network assistance is provided. Such transmission modes may enable improved spectral efficiency, reduced cost, and increased reliability as network service interruptions do not occur during handover operations for moving vehicles. Resource assignments do not need coordination between operators and subscription to a network is not necessary, therefore there is reduced complexity for such self-managed systems. The V2X system may be configured to operate in a licensed or unlicensed spectrum, thus any vehicle with an equipped system may access a common frequency and share information. Such harmonized/common spectrum operations allows for safe operation. The V2X system Referring to FIG. 4B, a second of two complementary transmission modes is illustrated. In the illustrated embodiment, a vehicle 410 may communicate to another vehicle 412 through network communications. These network communications may occur through discrete nodes, such as a BS (e.g., an eNB or gNB), that send and receive information between vehicles. The network communications may be used, for example, for long range communications between the vehicles (410, 412), such as noting the presence of an accident approximately 1 mile ahead. Other types of communication may be sent by the node to the vehicles (410, 412), such as traffic flow conditions, road hazard warnings, environmental/weather reports, service station availability and other like data. Such data can be obtained from cloud-based sharing services.

A UE may transmit S-SSB(s) to propagate a reference timing and/or frequency to other UEs. In certain cases, a UE may transmit the S-SSBs while being synchronized with a Global Navigation Satellite System (GNSS) (e.g., the GNSS 134), a cell (e.g., the BS 110a), or another UE (e.g., the UE 120b). For example, a UE may receive a synchronization signal from the GNSS, cell, or other UE and transmit S-SSBs in accordance with a timing derived from the synchronization signal. In certain cases, a UE may transmit the S-SSBs while not being synchronized with a synchronization reference such as the GNSS, cell, or other UE. For example, if the UE cannot detect any of synchronization signals from a GNSS, a cell, other UEs, the UE may transmit S-SSBs on its own to become an independent synchronization source. That is, a UE may serve as an independent synchronization reference for other UEs, for example, due to no other synchronization signal being available in a specific area.

The S-SSBs may be transmitted in a periodic manner, and one or more SSBs may repeated within the SSB period (e.g., a period of 16 frames equaling 160 ms). In other words, there may be an effective sub-period (e.g., an SSB interval) within the main SSB period, such that SSBs in the SSB period are separated in time by the sub-period. For example, a UE may be provided a number $N_{period}^{S-SSB}$ of S-SSBs in a period of a specific number of time-domain resources (e.g., 16 frames). The UE may assume that a transmission of the S-SSBs in the period is with a periodicity of the specific number of time-domain resources (e.g., 16 frames). The UE may determine indexes of slots that include S-SSBs as $N_{offset}^{S-SSB} + N_{interval}^{S-SSB} \cdot i_{S-SSB}$, where $i_{S-SSB}$ is a S-SSB index within the number of S-SSBs in the period, $N_{offset}^{S-SSB}$ is a slot offset from a start of the S-SSB period to the first slot including an S-SSB, and $N_{interval}^{S-SSB}$ is a slot interval between neighboring S-SSBs.

FIG. 4 is a diagram illustrating an example S-SSB period, in accordance with certain aspects of the present disclosure. As shown, within the S-SSB period 502, a first S-SSB 504a may be transmitted after the SSB offset 506, which provides a slot offset from the start of the S-SSB period 502. In certain cases, there may be no SSB offset within the S-SSB period 502, such that the first S-SSB 504a is transmitted at the first slot of the S-SSB period 502. The next S-SSB 504b may be spaced from the first time-domain resource unit (e.g., the first symbol) of the first S-SSB 504a by the SSB interval 508. In aspects, subsequent S-SSBs 504c and 505d may also be spaced according to the SSB interval 508. Generally speaking, the SSB interval 508 may provide an effective period in which S-SSBs are repeated in the SSB period 502. In certain cases, there may be no SSB interval, such that neighboring S-SSBs are transmitted consecutively without any time interval between the neighboring S-SSBs. In this example, there are four S-SSBs in the S-SSB period 502. An alternative or additional number of S-SSBs may be transmitted in the S-SSB period 502, such as 1, 2, 4, 8, 16, 32, or 64 S-SSB transmissions within one S-SSB period.

Figure 5:
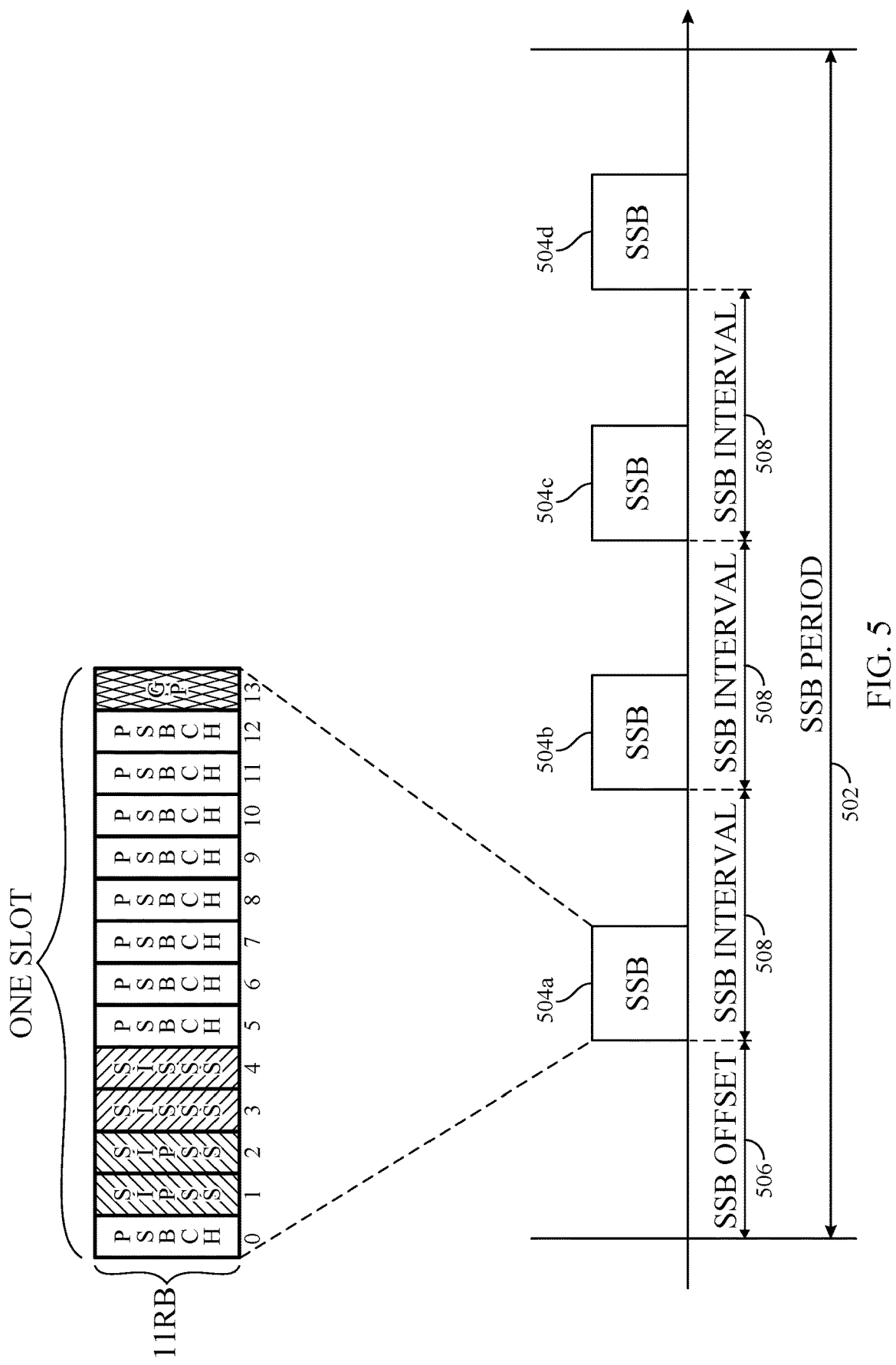
FIG. 5 is a diagram illustrating an example sidelink synchronization signal block (S-SSB) period, in accordance with certain aspects of the present disclosure.

In the frequency domain, an S-SSB may occupy a specific number of resource blocks (RBs) (e.g., 11 RBs) over a full slot, for example, as shown with respect to the first S-SSB 504a. The other RBs in the slot may not be used for data channel transmission. In the time-domain, the number of OFDM symbols in an S-SSB may depend on the cyclic prefix. For example, for a normal cyclic prefix, an S-SSB may have 13 symbols as depicted in FIG. 5, and for an extended cyclic prefix, the S-SSB may have 11 symbols.

Example Full-Duplex Sidelink Synchronization

In certain wireless communication systems (e.g., 5G NR) a UE may communicate with one or more other UEs via sidelink channels in a half-duplex manner, such as transmitting and monitoring for S-SSBs in a half-duplex manner within a fixed frequency location. For example, a first UE may monitor for a first S-SSB at a first occasion and transmit a second S-SSB at a second occasion, which may be separated from the first occasion by a time interval such as the SSB interval 508. A second UE may have the opposite synchronization pattern, such that the second UE transmit the first S-SSB at the first occasion and monitor for a second S-SSB at the second occasion. In aspects, the half-duplex communications supported for sidelink transmissions may provide undesirable spectral efficiency and undesirable latencies.

Aspects of the present disclosure provides various techniques for full-duplex sidelink synchronization. For example, aspects of the present disclosure provides synchronization techniques for some UEs that are full-duplex capable, and other UEs that are half-duplex capable. In other words, the synchronization techniques described herein may enable the coexistence/cooperation among full-duplex UEs and half-duplex UEs to synchronize amongst each other. In certain aspects, the synchronization techniques described herein may allocate frequency-time resources solely for full-duplex UEs, for example, in cases where only full-duplex UEs exist in the wireless communication system. In a case where full-duplex and half-duplex capable UEs coexist, the half-duplex UEs may continue to monitor and transmit S-SSBs at a specific frequency location and at specific S-SSB occasions, for example, as described herein with respect to FIGS. 7A and 7B. The full-duplex UEs may be configured to monitor and transmit S-SSBs at a single frequency location or a plurality of frequency locations and at specific S-SSB occasions, for example, as further described herein with respect to FIGS. 7A and 7B. In aspects, the S-SSB occasions/frequency locations for the full-duplex UEs may overlap with the S-SSB occasions/frequency resources for the half-duplex UEs to enable the full-duplex UEs and half-duplex UEs to synchronize with each other as further described herein.

In certain aspects, the full-duplex synchronization described herein may provide desirable spectral efficiency, time-domain efficiency, latencies, and/or data rates, for example, due to concurrent transmissions and receptions. In certain cases, the full-duplex synchronization described herein may enable V2X systems to share large payloads due to the data rates and bandwidth available to full-duplex communications.

Figure 6:
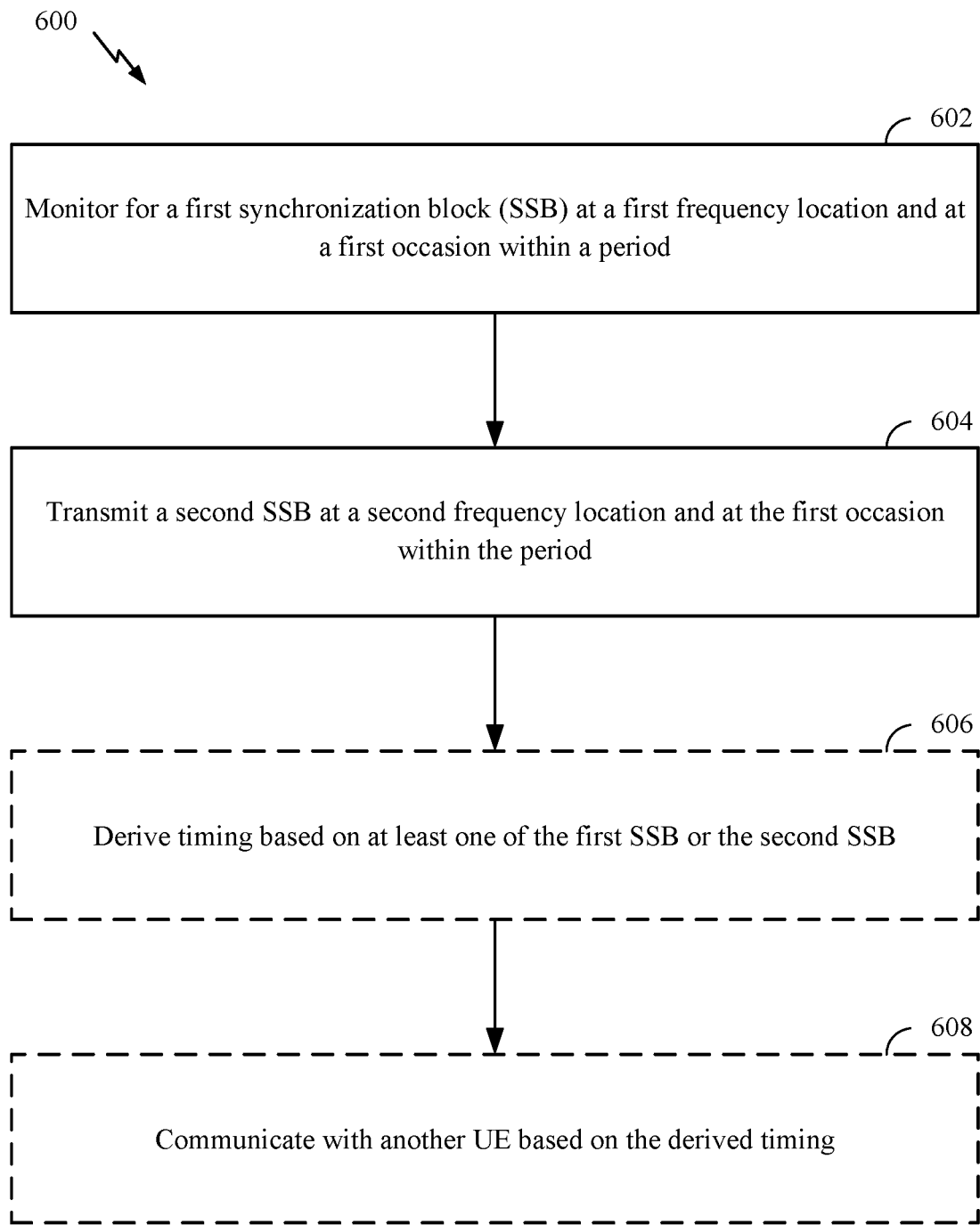
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., the UE 120a in the wireless communication network 100). The operations 600 may be implemented as software components that are executed and run on one or more processors (e.g., controller/processor 280 of FIG. 2). Further, the transmission and reception of signals by the UE in the operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 604, where a UE may monitor for a first SSB at a first frequency location and at a first occasion within a period. At 604, the UE may transmitting a second SSB at a second frequency location and at the first occasion within the period (e.g., the S-SSB period 502). In certain cases, at 606, the UE may derive timing based on at least one of the first SSB or the second SSB, and at 608, the UE may communicate with another UE based on the derived timing.

In aspects, the UE may perform the monitoring of the first SSB and transmission of the second SSB at the same first occasion, such that the UE is operating in a full-duplex manner. In other words, the UE may monitor for the first SSB and transmit the second SSB simultaneously in a full-duplex manner.

The first frequency location may be a specific frequency within a range of frequency bands (e.g., sub-7 GHz bands or mmWave bands). As used herein, a frequency location may refer to an absolute radio-frequency channel number (ARFCN), which may provide a starting location of a specific bandwidth part (BWP) for SSBs. That is, the first and/or second SSBs may be transmitted via a BWP that begins at the specific frequency location (e.g., the first frequency location or second frequency location). In aspects, the first SSB and/or second SSB may include a certain number of RBs (e.g., 11 RBs). In certain cases, a guard band may separate the first frequency location and the second frequency occasion, such that the specific BWPs used for transmissions of the first SSB and second SSB are separated by the guard band. The guard band may enable a full-duplex UE to suppress or prevent self-interference from contaminating the transmission/reception of S-SSBs concurrently. In certain cases, the BWPs for the first and second SSBs may overlap with each other, and the UE may perform self-interference cancellation to enable transmission/reception of S-SSBs concurrently.

A full-duplex UE may monitor for S-SSBs and/or transmit S-SSBs simultaneously or concurrently at a single frequency (e.g., a single BWP) or a plurality of frequencies (e.g., a plurality of BWPs). For example, the UE may transmit a third SSB at the first frequency location and at a second occasion within the period, and the UE may transmit a fourth SSB at the second frequency location and at the second occasion within the period. In certain cases, the UE may monitor for the third SSB at the first frequency location and at the second occasion within the period, and the UE may monitor for the fourth SSB at the second frequency location and at the second occasion within the period. In specific cases, the UE monitor for the third SSB at the first frequency location and at the second occasion within the period, and the UE may transmit the fourth SSB at the second frequency location and at the second occasion within the period. Alternatively, the UE may transmit the third SSB at the first frequency location and at the second occasion within the period, and the UE may monitor for a fourth SSB at the second frequency location and at the second occasion within the period.

In aspects, the first occasion and second occasion may occur at separate time periods. For example, the first occasion may occur after the second occasion. Alternatively, the second occasion may occur after the first occasion. In certain aspects, a time interval (e.g., the SSB interval 508) may separate the first occasion and the second occasion.

In certain aspects, a full-duplex UE may monitor for S-SSBs and/or transmit S-SSBs on specific frequencies (e.g., specific BWPs) shared with half-duplex UEs. That is, some of the frequencies used by full-duplex UEs for synchronization may overlap with the frequencies used by half-duplex UEs. For example, the first frequency location may be allocated for half-duplex and full-duplex sidelink communications, such as transmission/reception of S-SSBs, and the second frequency location may be allocated for full-duplex sidelink communications, such as transmission/reception of S-SSBs. In other words, the half-duplex and full-duplex UEs may monitor for and transmit S-SSBs at the first frequency location, which may enable coexistence among the half-duplex and full-duplex UEs.

In certain aspects, a full-duplex UE may be configured with separate occasions to monitor for S-SSBs or transmit S-SSBs than the half-duplex UEs. For example, the full-duplex UEs may have S-SSB occasions separated by a longer SSB interval (e.g., the SSB interval 508) than S-SSB occasions allocated for half-duplex UEs. In certain cases, the full-duplex UEs may have an SSB interval that is a multiple of the SSB interval for the half-duplex UEs. For example, the SSB interval for the full-duplex UEs may be twice as long as the half-duplex UEs, such that only half of the S-SSB occasions for the half-duplex UEs overlap with the S-SSB occasions for the full-duplex UEs. The longer SSB interval may due to the full-duplex UEs being capable of transmission and reception of S-SSBs simultaneously. In other words, the full-duplex synchronization may enable a UE to be allocated fewer time-domain resources for S-SSB transmission/reception than a half-duplex UE.

As an example, the UE may obtain a configuration (e.g., a sidelink synchronization configuration) indicating sets of one or more occasions for SSBs, where at least one of the sets may be allocated for full-duplex communications. A set of the one or more occasions may be an S-SSB time allocation providing the number of S-SSBs within a period (e.g., the period 502), a time offset (e.g., the SSB offset 506), and/or an SSB interval (e.g., the SSB interval 508), for example, as described herein with respect to FIG. 5. The period may comprise one or more time-domain resources, such as 16 frames. The time offset may indicate the slot offset from the start of sidelink SSB period to the first sidelink SSB. The SSB interval may indicate the slot interval between neighboring sidelink SSBs. The time offset and/or the SSB interval may be set to zero slots, such that there is no time offset or SSB interval.

The UE may select one of the sets, for example, based on various criteria such as the type of synchronization reference that provides timing to the UE. For example, the UE may select a specific set of occasions if a base station services as the synchronization reference or a separate set of occasions if a GNSS serves as the synchronization. In certain cases, the UE may transmit the second SSB based on the selected set of occasions. That is, the first occasion may be within the selected set of occasions for transmission of the second SSB. In aspects, the selected set of occasions may be specifically allocated for full-duplex synchronization and enabling coexistence with half-duplex UEs as described herein.

In certain aspects, the UE of the operations 600 may be synchronized with a synchronization reference, such as a base station (e.g., the BS 110a), a GNSS (e.g., the GNSS 134), or another UE (e.g., the UE 120b). That is, the UE may acquire frequency and/or time synchronization with the synchronization reference. For example, the UE may receive a synchronization signal, such as an SSB from a base station, an S-SSB from the other UE, or a signal, which provides an indication of the time, from the GNSS. The UE may derive timing from the synchronization signal, such as the location of various time-domain resources with respect to the synchronization signal. In certain aspects, the UE may transmit the second SSB, at 604, based on the timing derived from the synchronization signal. In certain cases, the UE may communicate with the other UE based on the timing derived from the synchronization signal. In certain aspects, the UE may serve as its own synchronization reference and deriving its own timing. That is, deriving timing based on the second SSB at 606 may involve the UE establishing its own timing independent of another synchronization reference.

In certain aspects, the first SSB and/or second SSB may be sidelink SSBs, for example, as described herein with respect to FIG. 5. In certain cases, the first SSB may be a sidelink SSB from another UE or an SSB from a base station (e.g., via a Uu interface), and the second SSB may be a sidelink SSB.

Figure 7A:
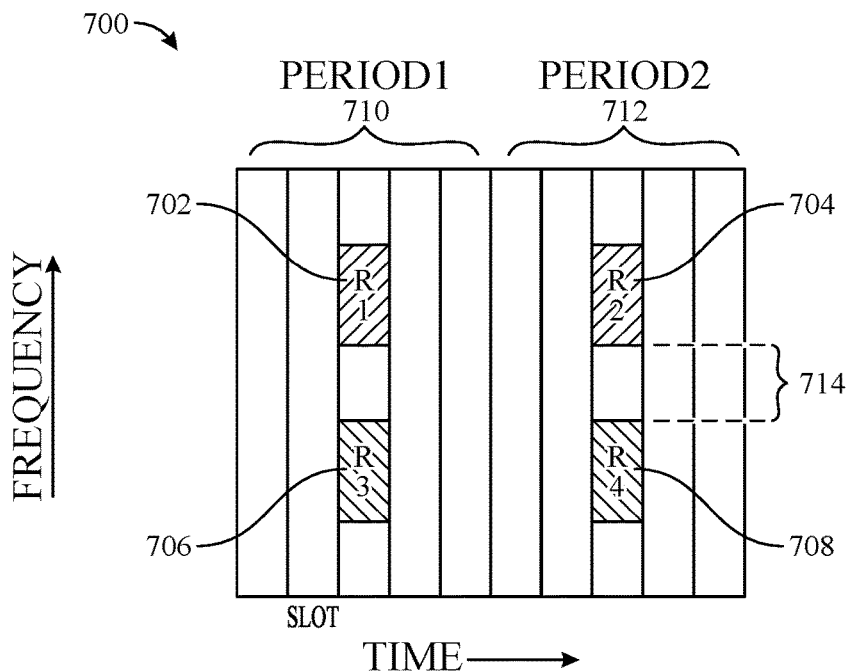
FIG. 7A is a diagram illustrating an example S-SSB resource grid, in accordance with certain aspects of the present disclosure.

FIG. 7A is a diagram illustrating an example S-SSB resource grid 700, in accordance with certain aspects of the present disclosure. As shown, the resource grid 700 includes S-SSB resources 702, 704, 706, and 708, where the S-SSB resources 704, 706 are within a first period 710, and the S-SSB resources 704, 708 are within the second period 712. In this example, the periods 710, 712 may refer to the time interval (e.g., the SSB interval 508) by which neighboring SSBs are separated within an SSB period (e.g., the period 502). In certain cases, the S-SSB resources 702, 706 may be separated by a guard band 714 in the frequency domain. In aspects, the resources 702, 706 may be at the same transmission/reception occasions (e.g., at the same slots) in the time domain, and the resources 704, 708 may be at the same transmission/reception occasions in the time domain. In certain aspects, the resources 702, 704 may be within the same frequency resources (e.g., at the same frequency location and/or in the same BWP) in the frequency domain, and the resources 706, 708 may be within the same frequency resources in the frequency domain.

As an example, half-duplex UEs may be configured to monitor/use the S-SSB resources 702, 704, while full-duplex UEs may be configured to monitor/use S-SSB resources 702, 704, 706, and 708. In other words, the half-duplex UEs may be configured to monitor/use the S-SSB resources 702, 704 within the same BWP, whereas full-duplex UEs may be configured to monitor/use S-SSB resources 702, 704, 706, and 708. In other words, the half-duplex UEs may be configured to monitor/use the S-SSB resources 702, 704, 706, and 708 within multiple BWPs.

Suppose, for example, that a first UE is a half-duplex UE serving as a synchronization reference. Referring to FIG. 7A, the first UE may transmit a first S-SSB at the resource 702. A second UE, which is a half-duplex UE, may receive the first S-SSB at the resource 702 and transmit a second S-SSB at the resource 704. A third UE, which is a full-duplex UE, may receive the first S-SSB at the resource 702 and may transmit a third S-SSB at the resource 704, a fourth S-SSB at the resource 706, and/or a fifth S-SSB at the resource 708. As the third UE receives and transmits S-SSBs at the same occasion for the resources 702, 706, the third UE is capable of acquiring synchronization and serving as a synchronization reference in a full-duplex manner.

In certain cases, synchronization resources may be allocated specifically for full-duplex UEs. For example, full-duplex UEs may be configured with the resources 702, 706 for synchronization. As the full-duplex UE can transmit and receive at the same time, only one slot may be allocated for synchronization operations per synchronization period (e.g., the period 502).

In certain cases, a full-duplex UE may obtain an indication to switch from a synchronization structure allocated for half-duplex UEs and full-duplex UEs (e.g., the resource grid 700) to a synchronization structure allocated solely for full-duplex UEs (e.g., a portion of the resource grid 700 include the resources 702, 706 or the resources 704, 708). For example, suppose a full-duplex UE receives, from a RSU (e.g., the RSU 408), an indication about the presence of other full-duplex UEs in a specific area. The UE may reconfigure the synchronization resources to a synchronization structure allocated solely for full-duplex UEs. In certain aspects, a full-duplex UE may be preconfigured to have a synchronization structure allocated solely for full-duplex UEs In certain aspects, a full-duplex UE that is in an acquisition phase (e.g., a phase in which the UE is searching for a synchronization reference, such as a base station, GNSS, or another UE) may be configured to scan resources allocated to half-duplex UEs, such as the resources 702, 704. If a full-duplex UE receives an SSB from another UE via resources allocated to half-duplex UEs (e.g., the resources 702, 704), the full-duplex UE may also use the resources allocated to half-duplex UEs for transmitting its own SSB. If a full-duplex UE cannot acquire synchronization from a synchronization reference, the full-duplex UE may become an independent synchronization source by transmitting an S-SSB. In such a case, the UE may select a resource allocated to half-duplex UEs to transmit an SSB. In certain cases, the UE may randomly select the resources for S-SSB transmission.

Figure 7B:
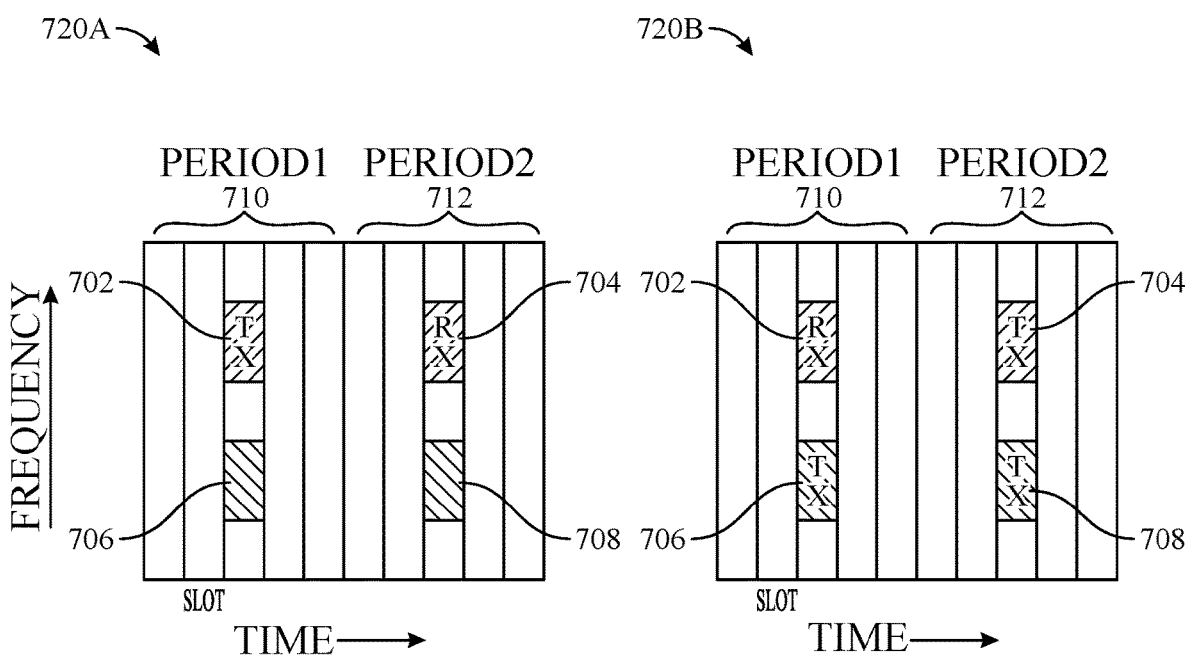
FIG. 7B illustrates diagrams of example S-SSB resource grids from the perspective of a half-duplex UE and a full-duplex UE, respectively, in accordance with certain aspects of the present disclosure.

FIG. 7B illustrates diagrams of example S-SSB resource grids 720A, 720B from the perspective of a half-duplex UE and a full-duplex UE, respectively, in accordance with certain aspects of the present disclosure. Suppose, for example, the synchronization reference is a first UE, which is full-duplex capable. As shown in the resource grid 720B, the first UE may transmit a first S-SSB at the resource 704, and optionally, a second S-SSB at the resource 706 and a third S-SSB at the resource 708. As depicted in the resource grid 720A, a second UE, which is a half-duplex UE, may receive the first S-SSB at the resource 704 and transmit a fourth S-SSB at the resource 702. A third UE, which is full-duplex capable, may receive the S-SSBs in any of the resources 702, 704, 706, 708 and may transmit a fifth S-SSB in one of the resources other than used for reception.

Figure 8:
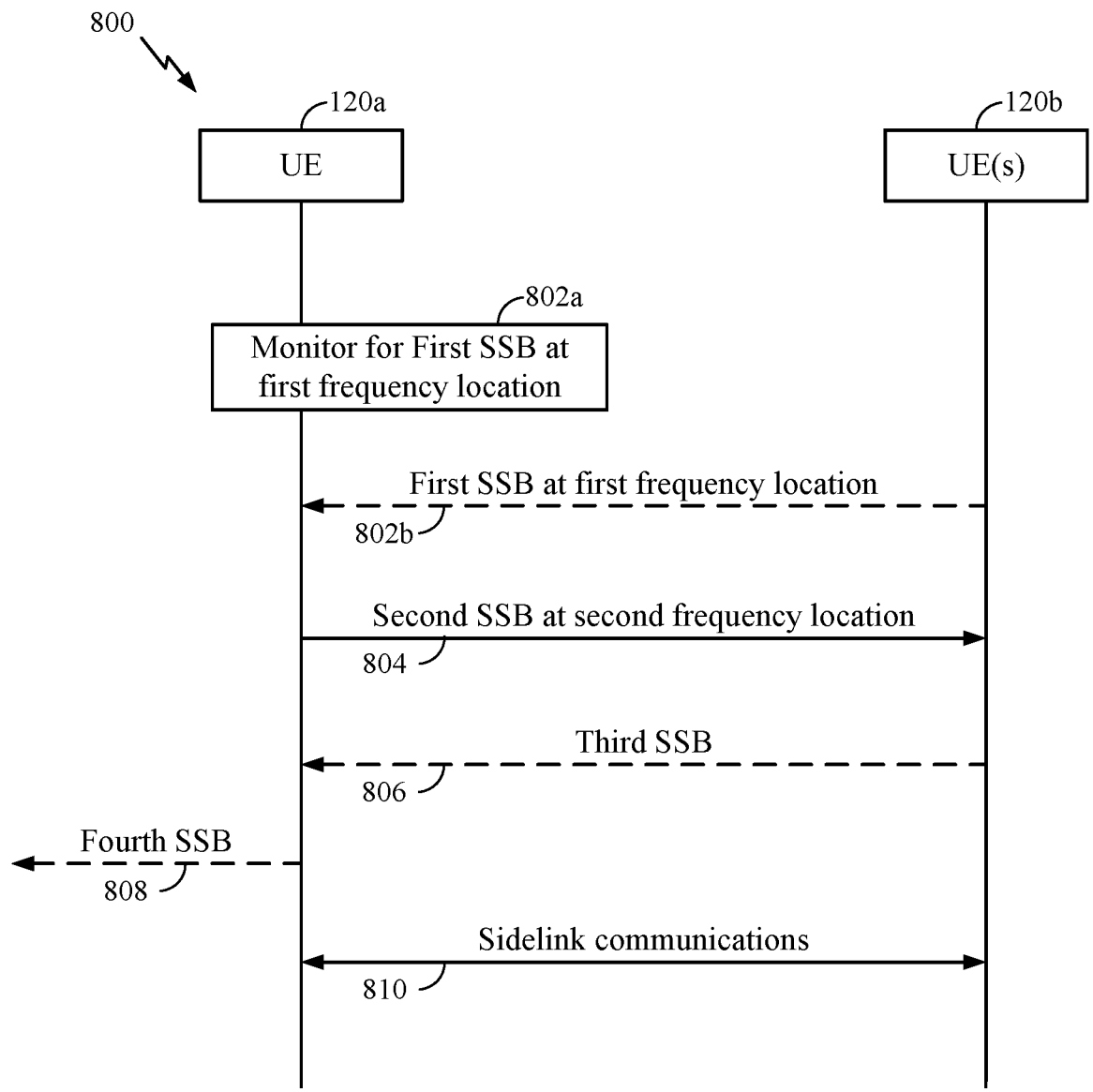
FIG. 8 is a signal flow diagram illustrating operations for full-duplex sidelink synchronization, in accordance with certain aspects of the present disclosure.

FIG. 8 is a signal flow diagram illustrating operations 800 for full-duplex sidelink synchronization, in accordance with certain aspects of the present disclosure. As shown, at 802a, the first UE 120a, which may be full-duplex capable, monitors for a first SSB at a first frequency location and at a first occasion within a period (e.g., the period 502). At 802b, the first UE 120a may receive the first SSB from a second UE 120b at the first occasion. In a full-duplex manner, at 804, the first UE 120a may transmit a second SSB at a second frequency location and at the first occasion. In certain cases, the second SSB may be received by the second UE 120b, such that the second UE 120b may also be full-duplex capable. In certain cases, at 806, the first UE 120a may receive a third SSB at a second occasion, and at 808, the first UE 120a may transmit a fourth SSB at the second occasion. In aspects, the fourth SSB may be transmitted at a separate beam orientation than the second SSB. At 810, the first UE 120a may communicate with the second UE 120*b* via sidelink transmissions based on timing derived from at least one of the SSB s.

While the examples provided herein are described with respect to the first UE 120*a* communicating/synchronizing with the second UE 120*b*, aspects of the present disclosure may also be applied to the first UE 120*a* communicating/synchronizing with multiple second UEs 120*b*.

Figure 9:
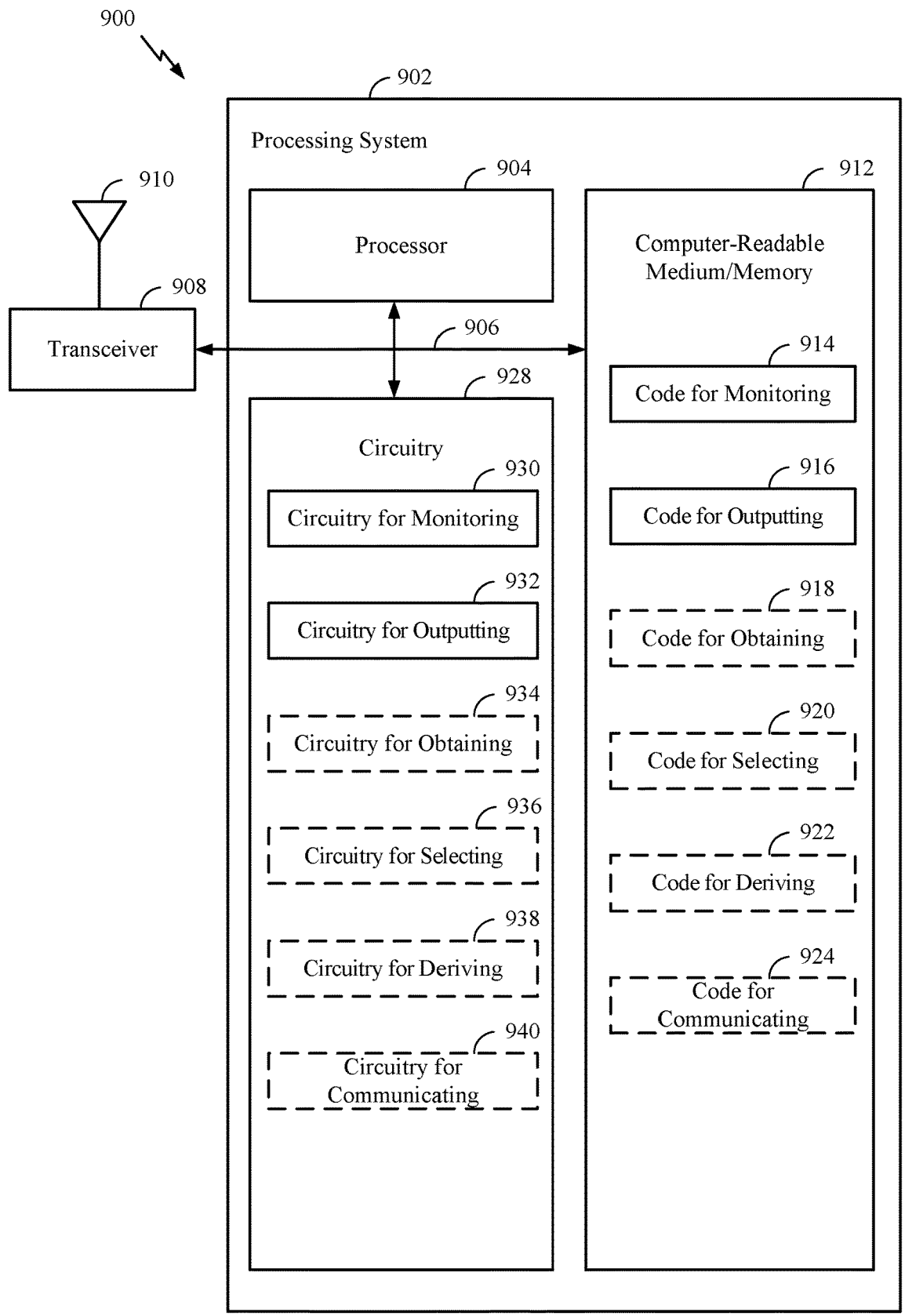
FIG. 9 illustrates a communications device (e.g., a UE) that may include various components configured to perform operations for the techniques disclosed herein in accordance with aspects of the present disclosure.

FIG. 9 illustrates a communications device 900 (e.g., a UE) that may include various components (e.g., corresponding to means-plus-function components) configured to perform operations for the techniques disclosed herein, such as the operations illustrated in FIG. 6. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein for full-duplex sidelink synchronization. In certain aspects, the computer-readable medium/memory 912 stores code for monitoring 914, code for outputting 916 (e.g., SSB for transmission), code for obtaining 918, code for selecting 920, code for deriving 922, and/or code for communicating 924. In certain aspects, the processing system 902 has circuitry 928 configured to implement the code stored in the computer-readable medium/memory 912. In certain aspects, the circuitry 928 is coupled to the processor 904 and/or the computer-readable medium/memory 912 via the bus 906. For example, the circuitry 928 includes circuitry for monitoring 930, circuitry for outputting 932 (e.g., SSB for transmission), circuitry for obtaining 934, circuitry for selecting 936, circuitry for deriving 938, and/or circuitry for communicating 940.

EXAMPLE ASPECTS

Aspect 1: A method for wireless communications by a user equipment (UE), comprising: monitoring for a first synchronization block (SSB) at a first frequency location and at a first occasion within a period; and transmitting a second SSB at a second frequency location and at the first occasion within the period.

Aspect 2: The method of Aspect 1, further comprising: transmitting a third SSB at the first frequency location and at a second occasion within the period; and transmitting a fourth SSB at the second frequency location and at the second occasion within the period.

Aspect 3: The method of Aspect 2, wherein a time interval separates the first occasion and the second occasion.

Aspect 4: The method of any one of Aspects 1-3, further comprising: monitoring for a third SSB at the first frequency location and at a second occasion within the period; and monitoring for a fourth SSB at the second frequency location and at the second occasion within the period.

Aspect 5: The method of any one of Aspects 1-4, further comprising: monitoring for a third SSB at the first frequency location and at a second occasion within the period; and transmitting a fourth SSB at the second frequency location and at the second occasion within the period.

Aspect 6: The method of any one of Aspects 1-5, further comprising: transmitting a third SSB at the first frequency location and at a second occasion within the period; and monitoring for a fourth SSB at the second frequency location and at the second occasion within the period.

Aspect 7: The method of any one of Aspects 1-6, wherein: the first frequency location is allocated for half-duplex sidelink communications; and the second frequency location is allocated for full-duplex sidelink communications.

Aspect 8: The method of any one of Aspects 1-7, further comprising: obtaining a configuration indicating sets of one or more occasions for SSBs, wherein at least one of the sets is allocated for full-duplex communications; selecting one of the sets, and wherein the transmission of the second SSB comprises transmitting the second SSB based on the selected set of the one or more occasions.

Aspect 9: The method of any one of Aspects 1-8, further comprising: receiving a synchronization signal, wherein the transmission of the second SSB comprises transmitting the second SSB based on a timing derived from the synchronization signal.

Aspect 10: The method of Aspect 9, wherein the synchronization signal is received from at least one of a base station, a Global Navigation Satellite System (GNSS), or another UE.

Aspect 11: The method of any one of Aspects 1-10, wherein the first SSB and the second SSB are sidelink SSBs.

Aspect 12: The method of any one of Aspects 1-11, wherein a guard band separates the first frequency location and the second frequency occasion.

Aspect 13: The method of any one of Aspects 1-12, wherein the period comprises one or more time-domain resources.

Aspect 14: The method of any one of Aspects 1-13, further comprising: deriving timing based on at least one of the first SSB or the second SSB; and communicating with another UE based on the derived timing.

Aspect 15: A user equipment, comprising means for performing the operations of one or more of Aspects 1-14.

Aspect 16: A user equipment, comprising a transceiver and a processing system including at least one processor configured to perform the operations of one or more of Aspects 1-14.

Aspect 17: An apparatus for wireless communications by a user equipment (UE), comprising: a processing system configured to monitor for a first synchronization block (SSB) at a first frequency location and at a first occasion within a period; and an interface configured to output for transmission a second SSB at a second frequency location and at the first occasion within the period.

Aspect 18: A computer-readable medium for wireless communications by a user equipment (UE), comprising codes executable by an apparatus to: monitor for a first synchronization block (SSB) at a first frequency location and at a first occasion within a period; and output for transmission a second SSB at a second frequency location and at the first occasion within the period.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a UE or a BS may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* shown in FIG. 2 may be configured to perform operations 600 of FIG. 6.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for monitoring, means for deriving, means for communicating, and means for selecting may include a processing system, which may include one or more processors, such as processors 258, 264 and 266, and/or controller/processor 280 of the UE 120*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the methods and apparatus described above without departing from the scope of the claims.

The invention claimed is:

1. A user equipment (UE) for wireless communications, comprising:
    a memory comprising executable instructions; and
    one or more processors configured to execute the instructions and cause the UE to:
        monitor for a first synchronization block (SSB) at a first frequency location and at a first slot in a first occasion within a period, wherein the first frequency location is a first frequency of a bandwidth part (BWP); and
        transmit a second SSB at a second frequency location and at the first slot in the first occasion within the period, wherein the second frequency location is a second frequency of the BWP.

2. The UE of claim 1, wherein the one or more processors are configured to execute the instructions and cause the UE to:
    transmit a third SSB at the first frequency location and at a second occasion within the period; and
    transmit a fourth SSB at the second frequency location and at the second occasion within the period.

3. The UE of claim 2, wherein a time interval separates the first occasion and the second occasion.

4. The UE of claim 1, wherein the one or more processors are configured to execute the instructions and cause the UE to:
    monitor for a third SSB at the first frequency location and at a second occasion within the period; and
    monitor for a fourth SSB at the second frequency location and at the second occasion within the period.

5. The UE of claim 1, wherein the one or more processors are configured to execute the instructions and cause the UE to:
    monitor for a third SSB at the first frequency location and at a second occasion within the period; and
    transmit a fourth SSB at the second frequency location and at the second occasion within the period.

6. The UE of claim 1, wherein the one or more processors are configured to execute the instructions and cause the UE to:
    transmit a third SSB at the first frequency location and at a second occasion within the period; and
    monitor for a fourth SSB at the second frequency location and at the second occasion within the period.

7. The UE of claim 1, wherein:
    the first frequency location is allocated for half-duplex sidelink communications; and
    the second frequency location is allocated for full-duplex sidelink communications.

8. The UE of claim 1, wherein the one or more processors are configured to execute the instructions and cause the UE to:
    obtain a configuration indicating sets of one or more occasions for SSBs, wherein at least one of the sets is allocated for full-duplex communications;
    select one of the sets; and
    wherein the transmission of the second SSB comprises transmitting the second SSB based on the selected set of the one or more occasions.

9. The UE of claim 1, wherein the one or more processors are configured to execute the instructions and cause the UE to:
    receive a synchronization signal; and
    wherein the transmission of the second SSB comprises transmitting the second SSB based on a timing derived from the synchronization signal.

10. The UE of claim 9, wherein the synchronization signal is received from at least one of a base station, a Global Navigation Satellite System (GNSS), or another UE.

11. The UE of claim 1, wherein the first SSB and the second SSB are sidelink SSBs.

12. The UE of claim 1, wherein a guard band separates the first frequency location and the second frequency location.

13. The UE of claim 1, wherein the period comprises one or more time-domain resources.

14. The UE of claim 1, wherein the one or more processors are configured to execute the instructions and cause the UE to:
derive timing based on at least one of the first SSB or the second SSB; and
communicate with another UE based on the derived timing.

15. A user equipment (UE), comprising:
a processing system configured to monitor for a first synchronization block (SSB) at a first frequency location and at a first slot in a first occasion within a period, wherein the first frequency location is a first frequency of a bandwidth part (BWP); and
a transmitter configured to transmit a second SSB at a second frequency location and at the first slot in the first occasion within the period, wherein the second frequency location is a second frequency of the BWP.

16. The UE of claim 15, wherein the transmitter is further configured to:
transmit a third SSB at the first frequency location and at a second occasion within the period; and
transmit a fourth SSB at the second frequency location and at the second occasion within the period.

17. The UE of claim 16, wherein a time interval separates the first occasion and the second occasion.

18. The UE of claim 15, wherein the processing system is further configured to:
monitor for a third SSB at the first frequency location and at a second occasion within the period; and
monitor for a fourth SSB at the second frequency location and at the second occasion within the period.

19. The UE of claim 15, wherein:
the processing system is further configured to monitor for a third SSB at the first frequency location and at a second occasion within the period; and
the transmitter is further configured to transmit a fourth SSB at the second frequency location and at the second occasion within the period.

20. The UE of claim 15, wherein:
the transmitter is further configured to transmit a third SSB at the first frequency location and at a second occasion within the period; and
the processing system is further configured to monitor for a fourth SSB at the second frequency location and at the second occasion within the period.

21. The UE of claim 15, wherein:
the first frequency location is allocated for half-duplex sidelink communications; and
the second frequency location is allocated for full-duplex sidelink communications.

22. The UE of claim 15, further comprising:
a receiver configured to receive a configuration indicating sets of one or more occasions for SSBs, wherein at least one of the sets is allocated for full-duplex communications;
wherein the processing system is further configured to select one of the sets; and
wherein the transmitter is configured to transmit the second SSB based on the selected set of the one or more occasions.

23. The UE of claim 15, further comprising:
a receiver configured to receive a synchronization signal; and
wherein the transmitter is configured to transmit the second SSB based on a timing derived from the synchronization signal.

24. The UE of claim 23, wherein the synchronization signal is received from at least one of a base station, a Global Navigation Satellite System (GNSS), or another UE.

25. The UE of claim 15, wherein the first SSB and the second SSB are sidelink SSBs.

26. The UE of claim 15, wherein a guard band separates the first frequency location and the second frequency location.

27. The UE of claim 15, wherein the period comprises one or more time-domain resources.

28. The UE of claim 15, wherein the processing system is further configured to:
derive timing based on at least one of the first SSB or the second SSB; and
communicate with another UE based on the derived timing.

29. A method for wireless communications at a user equipment (UE), comprising:
monitoring for a first synchronization block (SSB) at a first frequency location and at a first slot in a first occasion within a period, wherein the first frequency location is a first frequency of a bandwidth part (BWP); and
transmitting a second SSB at a second frequency location and at the first slot in the first occasion within the period, wherein the second frequency location is a second frequency of the BWP.

30. A non-transitory computer-readable medium for wireless communications by a user equipment (UE), comprising codes executable to:
monitor for a first synchronization block (SSB) at a first frequency location and at a first slot in a first occasion within a period, wherein the first frequency location is a first frequency of a bandwidth part (BWP); and
output for transmission a second SSB at a second frequency location and at the first slot in the first occasion within the period, wherein the second frequency location is a second frequency of the BWP.

* * * * *